US006854068B2

(12) United States Patent
Ishibe et al.

(10) Patent No.: US 6,854,068 B2
(45) Date of Patent: Feb. 8, 2005

(54) WANDER GENERATOR HAVING ARBITRARY TDEV MASK CHARACTERISTIC SETTING APPARATUS

(75) Inventors: Kazuhiko Ishibe, Samukawa-machi (JP); Tetsuya Tada, Yokohama (JP)

(73) Assignee: Anritsu Corporation, Tokyo (JP)

( * ) Notice: Subject to any disclaimer, the term of this patent is extended or adjusted under 35 U.S.C. 154(b) by 791 days.

(21) Appl. No.: 09/881,926

(22) Filed: Jun. 14, 2001

(65) Prior Publication Data

US 2002/0007466 A1 Jan. 17, 2002

(30) Foreign Application Priority Data

Jun. 20, 2000 (JP) ........................................ 2000-184962

(51) Int. Cl.[7] ............................ G01R 29/26; G06F 1/04
(52) U.S. Cl. ........................ 713/500; 345/440; 702/124
(58) Field of Search ................................ 345/764, 771, 345/440; 713/500, 600, 502; 702/124, 125, 176; 700/83

(56) References Cited

U.S. PATENT DOCUMENTS

| | | | | |
|---|---|---|---|---|
| 4,521,865 A | * | 6/1985 | Winkler et al. | 708/9 |
| 5,757,652 A | * | 5/1998 | Blazo et al. | 702/69 |
| 6,246,738 B1 | * | 6/2001 | Acimovic et al. | 375/240.03 |
| 2002/0007466 A1 | * | 1/2002 | Ishibe et al. | 713/500 |
| 2003/0112241 A1 | * | 6/2003 | Fernando | 345/440 |

FOREIGN PATENT DOCUMENTS

EP 1 167 985 A2 * 1/2002 ........... G01R/29/26

OTHER PUBLICATIONS

Sonet User Guide, OmniBER 719, Agilent Technologies, Pinted Sep. 2000.*
Agilent Technologies OmniBER OTN Jitter Analyzer J7231B Technical Data Sheet, copyright 2002.*
Agilent Technologies "Characterize your network synchronization status as it develops", E4547A wander analysis software, Jun. 30, 2004.*
Anritsu Technical Note, "What is Wander", 2002.*
Anritsu MP1580A Portable 2.5G/10G Analyzer, 2002.*
Tektronix RF Transmission Monitor, RFA300A Introduction, Oct. 2002.*
User Manual, Real Time Wander Analyst Software, copyright 1998 Tektronix Inc.*
TrendCommunications, "Features and Benefits, Victoria Jitter/Wander"(no date), "Victoria Jitter/Wander" (Nov. 1, 2001), "Wander measurements with Victoria" (no date), "Victoria Jitter/Wander in Real–Time" (2003),available from www.trendtest.com.*

* cited by examiner

Primary Examiner—Fritz Fleming
(74) Attorney, Agent, or Firm—Frishauf, Holtz, Goodman & Chick, P.C.

(57) ABSTRACT

In a file, the TDEV mask data information including the TDEV mask data constituted by connecting a plurality of line segments and a calculation expression for forming the TDEV mask data, are stored in advance. A readout section reads out a predetermined TDEV mask data information from the file. A display section displays the line segment which is represented by the desired TDEV mask data information. An operating section inputs information for changing at least one of the start point and the characteristic value to the desired value with respect to the line segment to be represented by the desired TDEV mask data information. A TDEV mask data change section receives information inputted by the operating section and changes TDEV mask data ifnromation based on the calculation expression of the TDEV mask data information, and allows the display section to display the line segment represented by the changed TDEV mask data information.

24 Claims, 11 Drawing Sheets

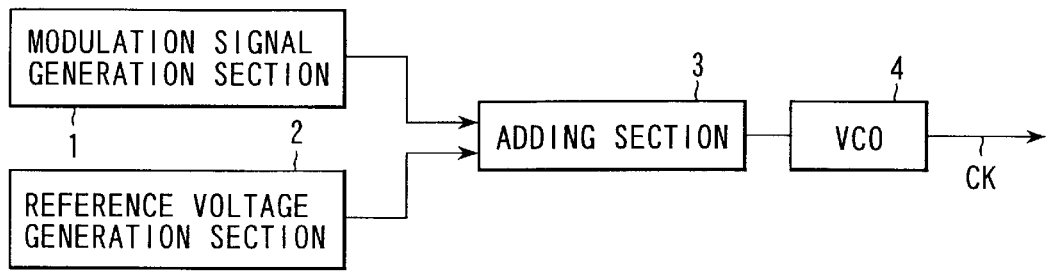

FIG. 9 (PRIOR ART)

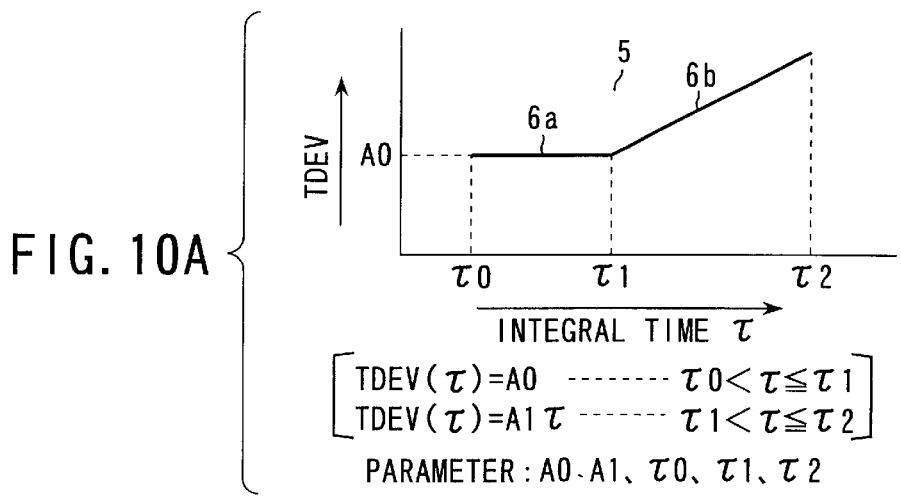

FIG. 10A $$\begin{bmatrix} TDEV(\tau)=A0 & \cdots\cdots & \tau 0 < \tau \leq \tau 1 \\ TDEV(\tau)=A1\tau & \cdots\cdots & \tau 1 < \tau \leq \tau 2 \end{bmatrix}$$

PARAMETER : A0、A1、$\tau 0$、$\tau 1$、$\tau 2$

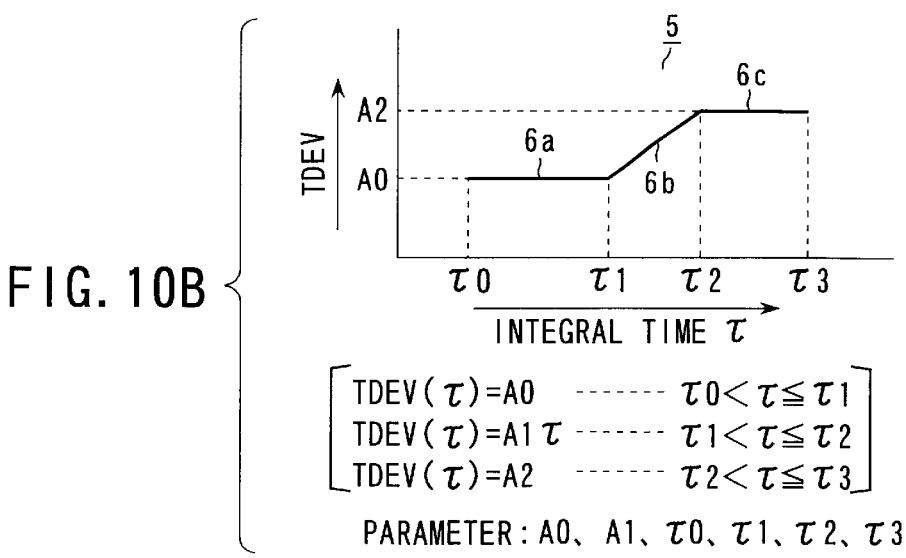

FIG. 10B $$\begin{bmatrix} TDEV(\tau)=A0 & \cdots\cdots & \tau 0 < \tau \leq \tau 1 \\ TDEV(\tau)=A1\tau & \cdots\cdots & \tau 1 < \tau \leq \tau 2 \\ TDEV(\tau)=A2 & \cdots\cdots & \tau 2 < \tau \leq \tau 3 \end{bmatrix}$$

PARAMETER : A0、A1、$\tau 0$、$\tau 1$、$\tau 2$、$\tau 3$

WANDER GENERATOR HAVING ARBITRARY TDEV MASK CHARACTERISTIC SETTING APPARATUS

CROSS-REFERENCE TO RELATED APPLICATIONS

This application is based upon and claims the benefit of priority from the prior Japanese Patent Application No. 2000-184962, filed Jun. 20, 2000, the entire contents of which are incorporated herein by reference.

BACKGROUND OF THE INVENTION

The present invention relates to a wander generator for generating a clock signal including wander. More specifically, the present invention relates to a wander generator having a TDEV mask characteristic setting apparatus for setting arbitrary TDEV mask characteristic which defines a time deviation (TDEV: Time DEViation) of a wander in an outputted clock signal.

As is well known, it is considered that a resistance characteristic against a phase fluctuation in a signal which is inputted in various electric devices and various transmission apparatuses, as one transmission characteristic of various electric devices and various transmission apparatuses which are incorporated into a digital transmission system.

Among these phase fluctuations in the inputted signal, a component of which fluctuation frequency is higher than 10 Hz is generally referred to as a jitter.

Alternatively, among these phase fluctuations, a component of which fluctuation frequency is lower than 10 Hz is generally referred to as a wander, which is described in the present invention.

Among these phase fluctuations, a time deviation (TDEV) characteristic is defined as an index for quantitatively evaluating a wander included in the inputted signal.

In the case of measuring this TDEV characteristic, a phase including a wander of a measured signal and a reference signal including no wander are sampled with a predetermined sampling frequency $\tau_s$.

Then, a phase of the measured signal including the wander is compared with a phase of the reference signal including no wander, the phase difference TIE (Time Interval Error) at each sampling time is sequentially obtained as a change amount xi (TIE data) with respect to an initial phase difference, namely, the phase difference originally exists between both of signals.

Alternatively, this change amount xi at each sampling time is obtained from the following expression (1) as a power of the change amount xi at a time of respective integral period (integral time) $\tau(=n \cdot \tau_s)$ and it is defined as a TDEV characteristic ($\tau$).

$$TDEV(\tau) = \sqrt{\frac{1}{6n^2(N-3n+1)} \sum_{j=1}^{N-3n+1} \left[ \sum_{i=j}^{n+j-1} (x_{i+2n} - 2x_{i-1} + x_i) \right]^2} \quad (1)$$

n=1, 2, . . . , N/3 (integer)

In the above expression (1), xi means a change amount, N means a total of samples, $\tau_s$ means a sampling frequency, n means the number of sampling frequencies and $\tau$ means an integral time (=$n \cdot \tau_s$).

In other words, this TDEV characteristic ($\tau$) is obtained by evaluating a power spectrum density distribution of the phase difference by a time (lapsed time).

There are the following three methods (1) to (3) as a measuring method for measuring a characteristic with respect to a wander belonged to a measured system of the aforementioned various electric devices and various transmission apparatuses.

(1) Measurement of a Characteristic of a Wander which is Generated by the Measured System Itself This is a method to obtain the aforementioned TDEV characteristic by measuring a wander included in the measured signal which is outputted from the measured system itself without applying an inputted signal, by using a wander measuring device.

Such a measured system comprises, for example, an oscillator or the like.

(2) Measurement of an Anti-wander Characteristic Belonged to the Measured System According to this method, at first, a test signal including a wander having a predetermined TDEV characteristic ($\tau$) is generated from a wander generator to be applied to the measured system. Then, a bit error measuring device measures the bit error in a signal outputted from the measured system.

In this way, it is evaluated how much this measured system can perform data processing without error with respect to the test signal.

(3) Measurement of a Transmission Characteristic of a Wander Belonged to the Measured System According to this method, at first, a test signal including a wander having a predetermined TDEV characteristic ($\tau$) is generated from a wander generator to be applied to the measured system. Then, the aforementioned TDEV characteristic ($\tau$) is obtained by measuring the wander included in an outputted signal of the measured system by using the wander measuring device.

As these measured systems, for example, a transponder, an amplifier and the like are considered.

In the respective measurements of (2) and (3) among these three measurements, a wander generator capable of generating a test signal including a wander having a predetermined TDEV characteristic ($\tau$) is needed.

As such a wander generator, for example, a wander generator constructed as shown in FIG. 9 is conventionally know.

In the other words, according to this wander generator, a modulation signal for modulating a frequency which is lower than 10 Hz and outputted from a modulation signal generation section 1, and a reference signal of a direct current which is outputted from a reference voltage generation section 2 are added in an adding section 3.

Then, by inputting an output of the adding section 3 in a voltage control oscillator (VCO) 4, the VCO 4 generates a clock signal CK which has a center frequency corresponding to the reference voltage and of which phase is modulated by the modulation signal.

This wander generator enables a frequency and a magnitude of the outputted clock signal CK to be changed by changing the frequency and the amplitude of the modulation signal which is outputted from the modulation signal generation section 1.

In the recent years, measuring standards for measuring a characteristic with respect to a wander belonged to the measures system are proposed by ANSI, ITU-T, ETSI or the like.

According to this standard, a TDEV characteristic ($\tau$) including a wander outputted from the wander generator is defined by a standard value (a characteristic value) referred to as a TDEV mask characteristic so that a universality of the measuring result with respect to the measured system can be secured.

Plural kinds of these TDEV mask characteristics are prepared corresponding to, for example, the kinds of the measured systems and the measurement purposes. However, as shown in FIGS. 10A and 10B, a plurality of line segments 6a, 6b and 6c are connected, so that one TDEV mask characteristic 5 is constituted Alternatively, a horizontal axis in this TDEV mask characteristic 5 is the aforementioned integral time $\tau(=n\cdot\tau_s)$ indicating the time elapse. A vertical axis is a characteristic value for indicating a power spectrum density of the change amount of a phase.

For example, the TDEV mask characteristic 5 shown in FIG. 10A is constituted of two line segments 6a and 6b. This TDEV mask characteristic 5 is defined in the following expression (2).

$$TDEV(\tau)=A1\tau, \tau1<\tau\leq\tau2 \qquad (2)$$

Here, A0, A1, $\tau$0, $\tau$1, $\tau$2 are respective parameters for specifying line segments 6a and 6b, which constitute this TDEV mask characteristic 5.

Specifically, $\tau$0 and $\tau$1 represent start points of respective line segments 6a and 6b, $\tau$2 represents an end point of the line segment 6b, A0 represents a characteristic value at a start point $\tau$0 and A1 represents an inclination of the line segment 6b.

Alternatively, the TDEV mask characteristic 5 shown in FIG. 10B is constituted of three line segments 6a, 6b, 6c and this TDEV mask characteristic 5 is defined in the following expression (3).

$$TDEV(\tau)=A0, \tau0<\tau\leq\tau1$$

$$TDEV(\tau)=A1\tau, \tau1<\tau\leq\tau2$$

$$TDEV(\tau)=A2, \tau2<\tau\leq\tau3 \qquad (3)$$

Here, A0, A1, A2, $\tau$0, $\tau$1, $\tau$2, $\tau$3 are respective parameters for specifying the line segments 6a, 6b, 6c which constitute the TDEV mask characteristics 5.

Specifically, $\tau$0, $\tau$1, $\tau$2 represent start points of the respective line segments 6a, 6b, 6c, $\tau$3 represents an end point of the line segment 6c, A0 represents a characteristic at a start point $\tau$0, A1 represents an inclination of the line segment 6b and A2 represents a characteristic value of the line segment 6c at a start point $\tau$2.

However, the wander generator shown in FIG. 6 only can modulate a phase of a single signal, so that it is difficult to generate a test signal including a wander of a TDEV characteristic, which satisfies the TDEV mask characteristic 5 constituted of a plurality of line segments 6a, 6b, 6c, of which characteristic values are different every for an integral time range determined by the aforementioned standard.

In order to solve such a disadvantage, the wander generator, in which a TDEV characteristic setting apparatus is incorporated, is developed.

In this TDEV characteristic setting apparatus, a plurality of TDEV mask characteristics, which are determined by the aforementioned respective standards, are stored in advance.

Specifically, the respective parameters A0, A1, A2, . . . , $\tau$0, $\tau$1, $\tau$2, $\tau$3 . . . are stored to specify a plurality of line segments 6a, 6b, 6c which constitute the respective TDEV mask characteristics 5.

When an operator of the wander generator inputs a characteristic number (graph number) for specifying the TDEV mask characteristic 5 on an operating panel, the respective parameters A0, A1, A2, . . . , $\tau$0, $\tau$1, $\tau$2, $\tau$3 of the TDEV mask characteristics 5 of the designated characteristic number which are stored in the TDEV characteristic setting apparatus are read out. After that, the TDEV mask characteristic 5 is formed to be applied to the modulation signal (fluctuation signal) generation section 1.

This modulation signal (fluctuation signal) generation section 1 generates a modulation signal (fluctuation signal) corresponding to this TDEV mask characteristic 5 on the basis of the inputted TDEV mask characteristic 5.

The modulation signal (fluctuation signal) corresponding to this TDEV mask characteristic 5 generated from this modulation signal (fluctuation signal) generation section 1 is added with a direct current reference voltage which is outputted from the reference voltage generation section 2 shown in FIG. 9, in the adding section 3.

Then, the output from the adding section 3 is inputted in a VCO 4 shown in FIG. 9, so that a clock signal CK which has a center frequency corresponding to the reference voltage, of which phase is modulated by the modulation signal (fluctuation signal) and which includes a wander having a TDEV characteristic ($\tau$) corresponding to the designated TDEV mask characteristic 5, is generated from the VCO 4.

However, there is a problem even in the wander generator in which the aforementioned TDEV characteristic setting apparatus is incorporated, as follows.

In other words, in this TDEV characteristic setting apparatus which is incorporated in the wander generator, several kinds of the TDEV mask characteristics 5 which are determined by the respective measurement standards such as ANSI, ITU-T, ETSI or the like, are only stored as described above.

However, in recent years, a digital communication technology has made rapid progress, so that it is earnestly desired for the characteristic with respect to the wander not only to be measured as determined by the aforementioned respective measurement standards but also to be measured under various measurement conditions.

In this case, as a new measurement condition, it is desired a TDEV mask characteristic which is quietly different from respective TDEV mask characteristics 5 determined by the above respective standards is capable of being set as a matter of course, further, it is desired to set simply and for a short time the TDEV mask characteristics in which a portion of the respective TDEV mask characteristics which are determined by respective standards is only changed.

BRIEF SUMMARY OF THE INVENTION

An object of the present invention is to provide a wander generator having an arbitrary TDEV mask characteristic setting apparatus which is capable of setting arbitrary TDEV mask characteristic which is required by a measurer with a simple operation and without error, other than respective TDEV mask characteristics determined by respective standards and further, which is capable of enlarging a measurement range with respect to a wander of a measured system using a wander generator to a large extent.

In order to achieve the above object, according to one aspect of the present invention, there is provided a wander generator having an arbitrary TDEV mask characteristic setting apparatus comprising:

wander generation means for generating a clock signal including a wander; and

TDEV mask characteristic setting means which is used in the wander generation means to designate a TDEV mask characteristic which is belonged to the wander included in the clock signal generated by the wander generation means;

the TDEV mask characteristic setting means comprising:

a file in which TDEV mask data information including the TDEV mask data constituted by connecting a plurality of line segments and a calculation expression for forming the TDEV mask data on a coordinate in which a horizontal axis represents an integral time and a vertical axis represents a characteristic value, are stored in advance;

TDEV mask data information readout means for reading out desired TDEV mask data information from the file;

a display section for displaying a line segment which is displayed by the desired TDEV mask data information which is read out by the TDEV mask data information readout means;

an operating section for inputting the information for changing at least one of the start point and the characteristic value to the desired value with respect to the line segment represented by the desired TDEV mask data information, which is displayed on the display section; and a TDEV mask data change section for receiving information inputted by the operating section and changing the TDEV mask data ifnromation based on the calculation expression of the TDEV mask data information which represents the line segment displayed on the display section, and displaying a line segment which is represented by the changed TDEV data information on the display section.

According to another aspect of the present invention, there is provided a method for setting an arbitrary TDEV mask characteristic which is used in a wander generator, the method comprising the steps of:

storing TDEV mask data information including TDEV mask data constituted by connecting a plurality of line segments and a calculation expression for forming the TDEV mask data on a coordinate in which a horizontal axis represents an integral time and a vertical axis represents a characteristic value, in advance in a file;

designating desired TDEV mask data information;

reading out the desired TDEV mask data information from the file;

displaying a line segment which is represented by the read desired TDEV mask data information on a display section;

inputting information for changing at least one of the start point and the characteristic value to a desired value with respect to the line segment represented by the desired TDEV mask data information which is displayed on the display section; and receiving the inputted information and changing the TDEV mask data ifnromation based on the calculation expression of the TDEV mask data information representing the line segment which is displayed on the display section, and simultaneously, displaying a line segment which is represented by the changed TDEV mask data information on the display section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a schematic diagram for illustrating a conventional and general wander generator;

FIGS. 10A and 10B are diagrams for illustrating a TDEV mask characteristics which are determined by a standard;

DETAILED DESCRIPTION OF THE INVENTION

Figure 1:
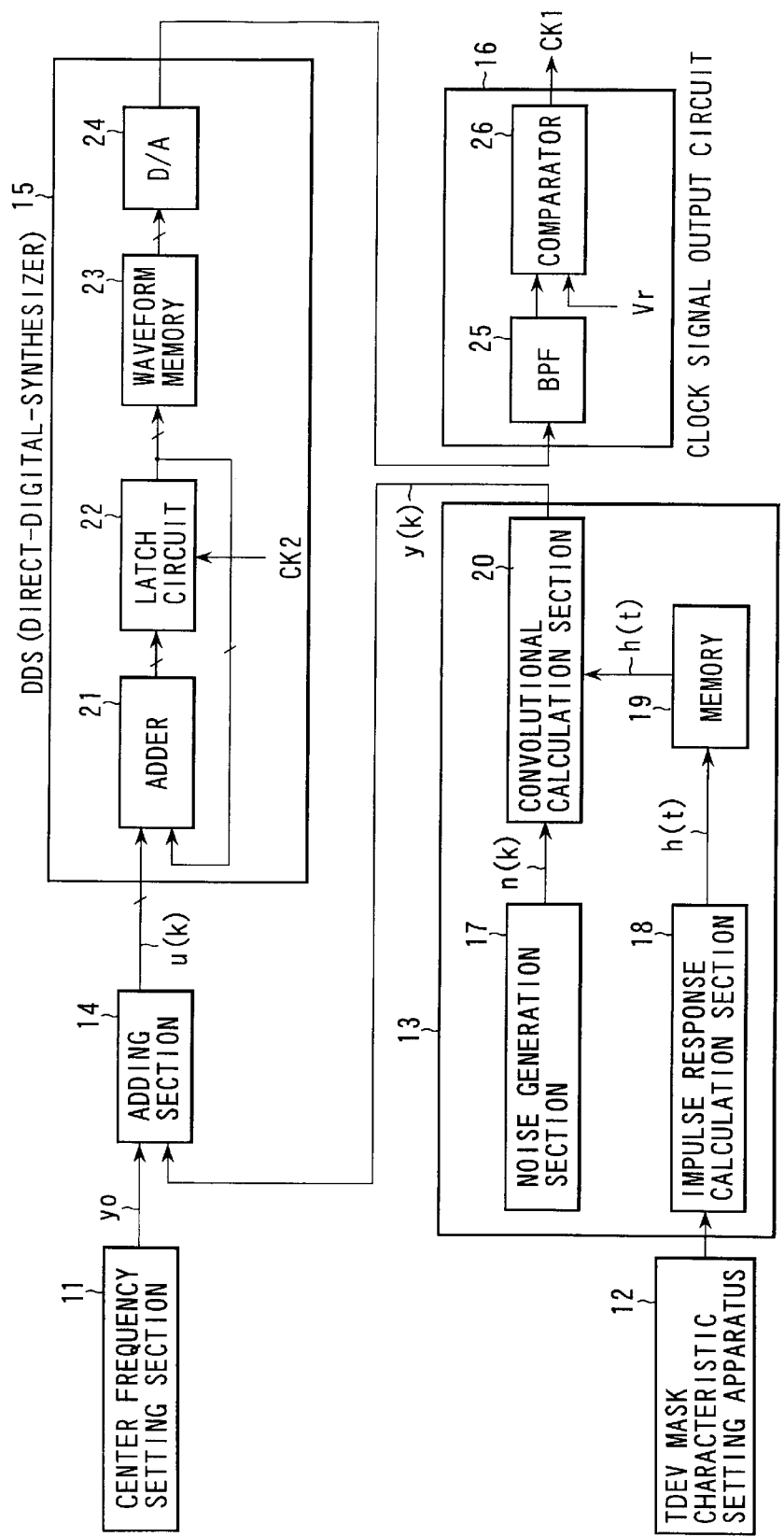
FIG. 1 is a block diagram for illustrating a schematic configuration of a wander generator in which a TDEV mask characteristic setting apparatus according to an embodiment of the present invention is incorporated.

At first, the outline of the present invention will be explained below.

The present invention is applied to a TDEV mask characteristic setting apparatus which is incorporated in a wander generator for generating a clock signal including a wander having a TDEV characteristic corresponding to the designated TDEV mask characteristic, the wander generator setting the TDEV mask characteristic.

The TDEV mask characteristic setting apparatus of the present invention is provided with a TDEV mask characteristic file for storing the TDEV mask characteristic which is constituted by connecting a plurality of line segments, respectively; TDEV mask characteristic readout means for reading out the operated and designated TDEV mask characteristic from the TDEV mask characteristic file and displaying it; change designation taking means for taking a change designation for changing a start point of respective line segments, which constitute the TDEV mask characteristic, or a change designation of a characteristic value at a start point; and TDEV mask characteristic changing means for receiving respective change designations which are taken by this change designation taking means, and changing the operated and designated TDEV mask characteristic by calculating respective parameters which specify the line segments including the start point, the inclination and the characteristic value at the start point, foe each line segment constituting the operated and designated TDEV mask characteristic.

In the TDEV mask characteristic setting apparatus of the wander generator constituted as described above, for example, respective TDEV mask characteristics, which are determined by the standards, are stored in the TDEV mask characteristic file.

When newly setting the TDEV mask characteristic, in the case that this TDEV mask characteristic to be newly set approaches one of the respective TDEV mask characteristics, which are determined by the standards stored in the TDEV mask characteristic file, the TDEV mask characteristic is read out on the display screen and the change instruction of the start point of the line segment to be changed among the respective line segments constituting this TDEV mask characteristic or the change instruction of the characteristic value at the start point is inputted.

Then, by using these respective change instructions, the respective parameters are automatically calculated to specify the line segments including a start point, the inclination, and a characteristic value at the start point for every line segment constituting the designated TDEV mask characteristic.

In other words, the respective line segments constituting the TDEV mask characteristic is connected each other.

Accordingly, in the case that the start point and the end point of a target line segment and respective characteristic values at the start point and the end point are changed, unless the start points and the end points of the respective line segments adjacent to the target line segment and the respective characteristic values and the inclination at the start point and the end point are changed simultaneously, a discontinuous portion or an overlapped portion is generated between the adjacent line segments.

In order to prevent such a matter from occurring, the operator is needed to input respective change instructions on the start point, the end point and the characteristic value and the like of the target line segment. Further, in accordance with this, the operator is needed to input respective change instructions on the start point, the end point, the inclination and the characteristic value and the like of the adjacent respective line segments which are required to be changed.

In this case, in order to accurately determining the start point, the end point, the inclination and the characteristic value and the like of the adjacent respective line segments and input the change instruction so that the discontinuous portion and the overlapped portion are not generated, the operator is needed to perform the operation with many troubles.

Therefore, according to the present invention, when the operator inputs respective change instructions on the start point, the end point and the characteristic value and the like of the target line segment, the parameters of the start point, the end point, the characteristic value and the like of the adjacent respective line segments are automatically calculated so as to prevent the discontinuous portion and the overlapped portion from being generated.

Thus, the operators is capable of setting newly and simply a TDEV mask characteristic by using the TDEV mask characteristic which is stored in the TDEV mask characteristic file, in the case of newly setting a TDEV mask characteristic.

According to another aspect of the present invention, the aforementioned TDEV mask characteristic setting apparatus of the present invention is further provided with a TDEV mask pattern file for storing a plurality of the TDEV mask patterns which is constituted by connecting a plurality of line segments, respectively; TDEV mask pattern readout means for reading out the operated and designated TDEV mask pattern from the TDEV mask pattern file and displaying it; new parameter taking means for taking the start point of respective line segments constituting the operated and inputted TDEV mask pattern and a characteristic value at this start point; TDEV mask characteristic newly generating means for newly obtaining a TDEV mask characteristic by calculating respective parameters which specify the line segment including the start point, the inclination and the characteristic value at the start point, for each line segment constituting the operated and designated TDEV mask pattern by using respective start points and respective characteristic values which are taken by the new parameter taking means.

In the TDEV mask characteristic setting apparatus constituted as described above, a plurality of TDEV mask patterns which is expected to be required to be newly set are written in the TDEV mask pattern file in advance.

In the case of newly setting the TDEV mask characteristic, the operator reads out the TDEV mask pattern to which a mask pattern of a TDEV mask characteristic to be newly set is identical with among respective mask patterns which are stored in the TDEV mask pattern file, on the display screen. Then, the operator inputs only the start points of respective line segments constituting this TDEV mask pattern and the characteristic values at this start points.

After that, by using a condition such that respective line segments of the TDEV mask characteristic are connected, respective parameters for specifying the line segment including the start point, the inclination and the characteristic value at the start point are automatically calculated for each line segment constituting a new TDEV mask characteristic.

Thus, in the case of newly setting a TDEV mask characteristic, the operator is capable of newly and simply setting a TDEV mask characteristic by using the TDEV mask pattern which is stored in the TDEV mask pattern file.

Next, an embodiment based on the aforementioned configuration according to the present invention will be described with reference to the drawings.

FIG. 1 is a block diagram for illustrating a schematic configuration of a wander generator, in which a TDEV mask characteristic setting apparatus according to an embodiment of the present invention is incorporated.

This wander generator is roughly constituted of a center frequency setting section 11, a TDEV mask characteristic setting apparatus 12, a fluctuation signal row generation section 13, an adding section 14, a DDS (direct-digital-synthesizer) 15 and a clock signal output circuit 16.

Additionally, the center frequency setting section 11 transmits a center frequency (for example, 2 NMz) of a clock signal CK1 to be employed in a test signal which is outputted from the wander generator, namely, the digital data Y0 for determining the center frequency of the outputted signal of the DDS 15 to the adding section 14.

The TDEV mask characteristic setting apparatus 12 creates the TDEV mask characteristic which is designated by an operator, and transmits it to the fluctuation signal row generation section 13.

Here, the fluctuation signal row generation section 13 is constituted of a noise generation section 17, an impulse response calculation section 18, a memory 19 and a convolutional calculation section 20.

In the fluctuation signal row generation section 13 having such a configuration, the noise generation section 17 is constituted of, for example, a PN (pseudo noise) signal generating circuit, which generates a PN signal n(k) and transmits it to the convolutional calculation section 20.

Alternatively, the impulse response calculation section 18 calculates a tap coefficient h(t) for every time of an impulse response of a transfer function which approaches a power spectrum density distribution characteristic of a change amount of a phase difference, which is indicated by the TDEV mask characteristic inputted from the TDEV mask characteristic setting apparatus 12, and stores it in the memory 19.

Additionally, the convolutional calculation section 20 outputs a fluctuation signal row y(k) which satisfies the TDEV mask characteristic inputted from the TDEV mask characteristic setting apparatus 12, by performing the convolutional calculation by using the PN signal n(k) outputted from the noise generation section 17 and the tap coefficient h(t) for every time, which is stored in the memory 19.

Further, the adding section 14 adds the data Y0 set by the center frequency setting section 11 and the fluctuation signal row y(k) outputted from the fluctuation signal row generation section 13, so that the adding section 14 transmits data u(k) of the addition result to the DDS 15.

Here, the DDS 15 is constituted of an adder 21, a latch circuit 22, a waveform memory 23 and a digital/analog (D/A) converter 24.

In such DDS 15, the latch circuit 22 synchronizes the outputted data from the adder 21 with the clock signal CK2 having a further higher frequency compared with the frequency of the clock signal CK1 to be outputted. Then, the latch circuit 22 latches the outputted data of the adder 21.

In this case, the adder 21 adds the data u(k) of the addition result including a component of the inputted fluctuation signal row y(k) and the data latched by the latch circuit 22 to transmit the added data to the latch circuit 22.

Alternatively, the waveform memory 23 reads out the data of the address which is designated by the output of the latch circuit 22 in which sine wave data is stored in a continuous address range in advance, to store and hold it.

In other words, a waveform of a clock signal in which the data of the fluctuation signal row data is added to a reference sine waveform, namely, a wander is added to a reference sine waveform, is stored in this waveform memory 23.

Alternatively, the digital/analog (D/A) converter 24 reads out the waveform data which is stored in the waveform memory 23, and converts it into an analog signal to transmit it to the next clock signal output circuit 16.

Here, the clock signal output circuit 16 is constituted of a band pass filter (BPF) 25 and a comparator 26.

In this clock signal output circuit 16, in order to form the waveform of the analog signal, which is outputted from the DDS 15, and create a final clock signal CK1, the waveform of the analog signal of a step waveform to be outputted from the DDS 15 is formed in the BPF 25 having a pass band width corresponding to the data Y0 to be inputted to the comparator 26.

Further, the comparator 26 binarizes the analog signal of which waveform is formed and outputted from the BPF 25, with a threshold voltage Vr, so that the comparator 26 outputs binarized signal as a clock signal CK1 having a rectangular waveform.

Therefore, this wander generator is capable of generating the clock signal CK1 having a wander of the TDEF characteristic in accordance with the TDEV mask characteristic, which is set by the operator with the TDEV mask characteristic setting apparatus 12.

Next, a configuration and a detailed operation of the TDEV mask characteristic setting apparatus 12 will be explained.

Figure 2:
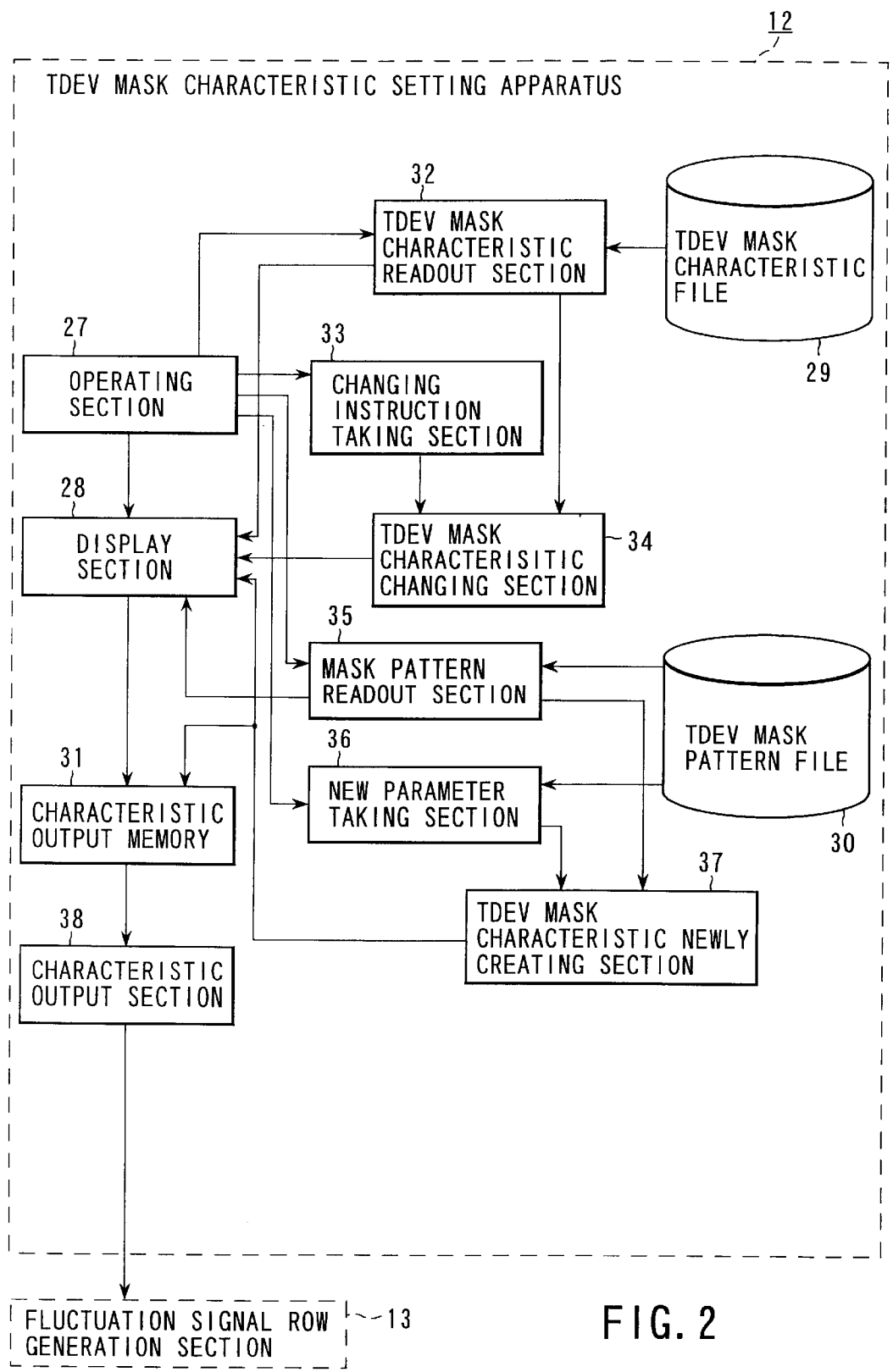
FIG. 2 is a block diagram for illustrating a schematic configuration of the TDEV mask characteristic setting apparatus shown in FIG. 1.
Figure 3A:
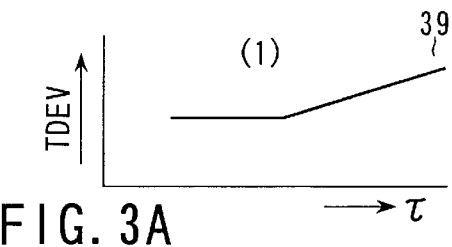
FIGS. 3A to 3L are diagrams for illustrating storage contents of TDEV mask pattern files (1) to (12), which are formed in the TDEV mask characteristic setting apparatus shown in FIG. 1.
Figure 3G:
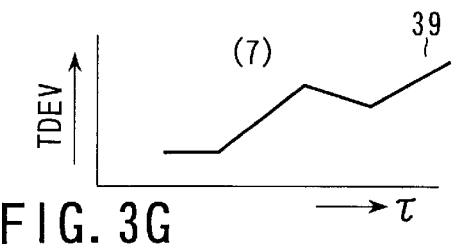
Figure 3B:
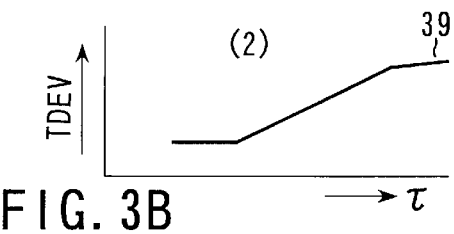
Figure 3H:
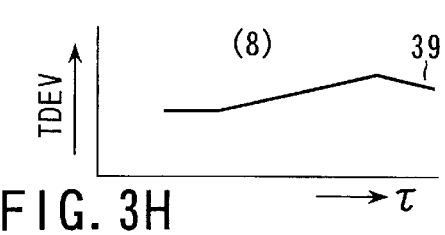
Figure 3C:
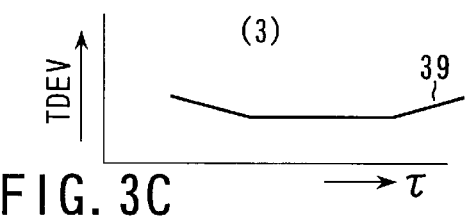
Figure 3I:
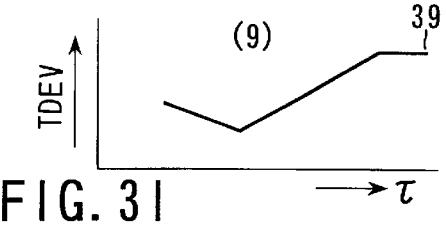
Figure 3D:
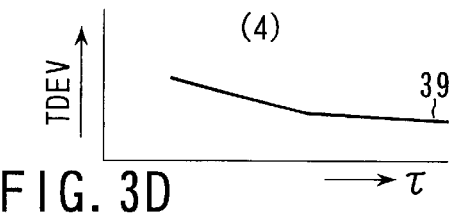
Figure 3J:
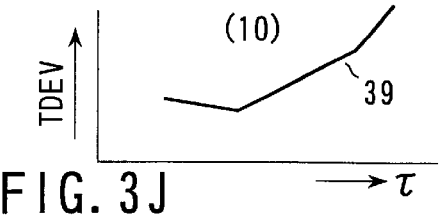
Figure 3E:
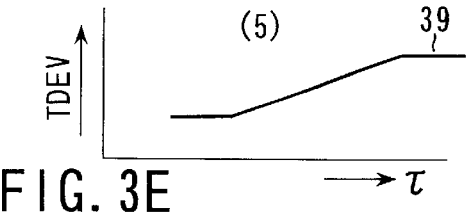
Figure 3K:
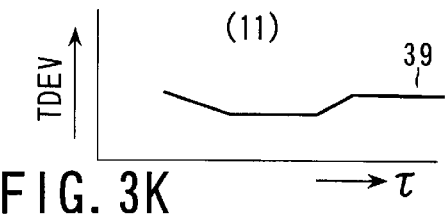
Figure 3F:
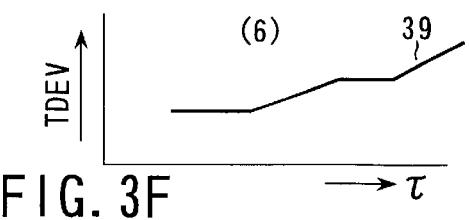
Figure 3L:
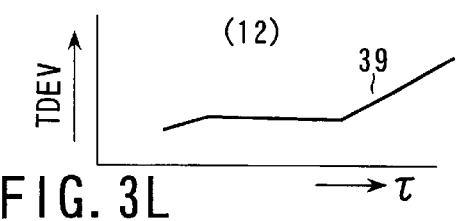

FIG. 2 is a functional block for illustrating a schematic configuration of the TDEV mask characteristic setting apparatus 12 which is constituted of, for example, a microcomputer.

In other words, in this TDEV mask characteristic setting apparatus 12, an operating section 27 comprising various operating buttons and operational knob or the like, which are disposed on an operational panel (not illustrated), a display section 28 comprising a liquid crystal display or the like which are disposed on the operational panel, a TDEV mask characteristic file 29, a TDEV mask pattern file 30 and a characteristic output memory 31 are provided.

Additionally, in the TDEV mask characteristic file 29, for example, as shown in FIGS. 10A and 10B, a plurality of the TDEV mask characteristics 5 which are defined by the aforementioned three classes of respective standards ANS1, ITU-1 and ETSI, and constituted by connecting a plurality of line segments 6a, 6b, . . . , respectively, are stored.

Specifically, in order to save the memory capacity, the TDEV mask characteristic file 29 does not store a graph itself of respective the TDEV mask characteristics 5 therein. However, the TDEV mask characteristic file 29 stores and holds the parameters A0, A1, A2, . . . , τ0, τ1, τ2, τ3, . . . such as the start points every for respective line segments 6a, 6b, . . . , the characteristic values at the start points and the inclination in the case of the inclination exists or the like for each TDEV mask characteristics 5.

Alternatively, in the TDEV mask pattern file 30, for example, as shown in FIG. 3A to FIG. 3L, the TDEV mask patterns 39 as patterns of a plurality of TDEV mask characteristics which are expected to be newly required to be set, are stored.

This TDEV mask pattern 39 indicates of how many line segments, 6a, 6b, . . . , the TDEV mask characteristic is constituted, discrimination between respective line segments are horizontal (inclination=0) or respective line segments are inclined in any direction and a combination pattern of respective line segments having this discrimination.

According to the TDEV mask characteristic setting apparatus 12 of this embodiment, as shown in FIGS. 3A to 3L, twelve TDEV mask patterns 39 to which graph number from (1) to (12) are added are stored in the TDEV mask pattern file 30.

Alternatively, items of parameters of respective line segments 6a, 6b, . . . are stored for every TDEV mask pattern 39 by using the TDEV mask pattern 39 in this TDEV mask pattern file 30 together with the aforementioned twelve TDEV mask patterns 39. In order to obtain the TDEV mask characteristic corresponding to this pattern, the operator should at least input parameters of respective line segments 6a, 6b, . . . .

Further, in this TDEV mask pattern file 30, a calculation expression for calculating all parameters A0, A1, A2, . . . , τ0, τ1, τ2, τ3, . . . to specify respective line segments 6a, 6b, . . . is stored by using the parameter which is inputted in the case that the parameter of the aforementioned items are inputted.

Additionally, the TDEV mask characteristic, which is created in this TDEV mask characteristic setting apparatus 12, is written in the characteristic output memory 31.

Specifically, respective characteristic values in respective integral times $\tau(=n\tau_s)$ in the calculated TDEV mask characteristic are stored in the characteristic output memory 31.

Further, for example, a TDEV mask characteristic readout section 32 which is formed on an application program of a microcomputer, a changing designation taking section 33, a TDEV mask characteristic changing section 34, a mask pattern readout section 35, a new parameter taking section 36, a TDEV mask characteristic newly creating section 37 and a characteristic output section 38 and the like are incorporated in this TDEV mask characteristic setting apparatus 12.

Figure 4:
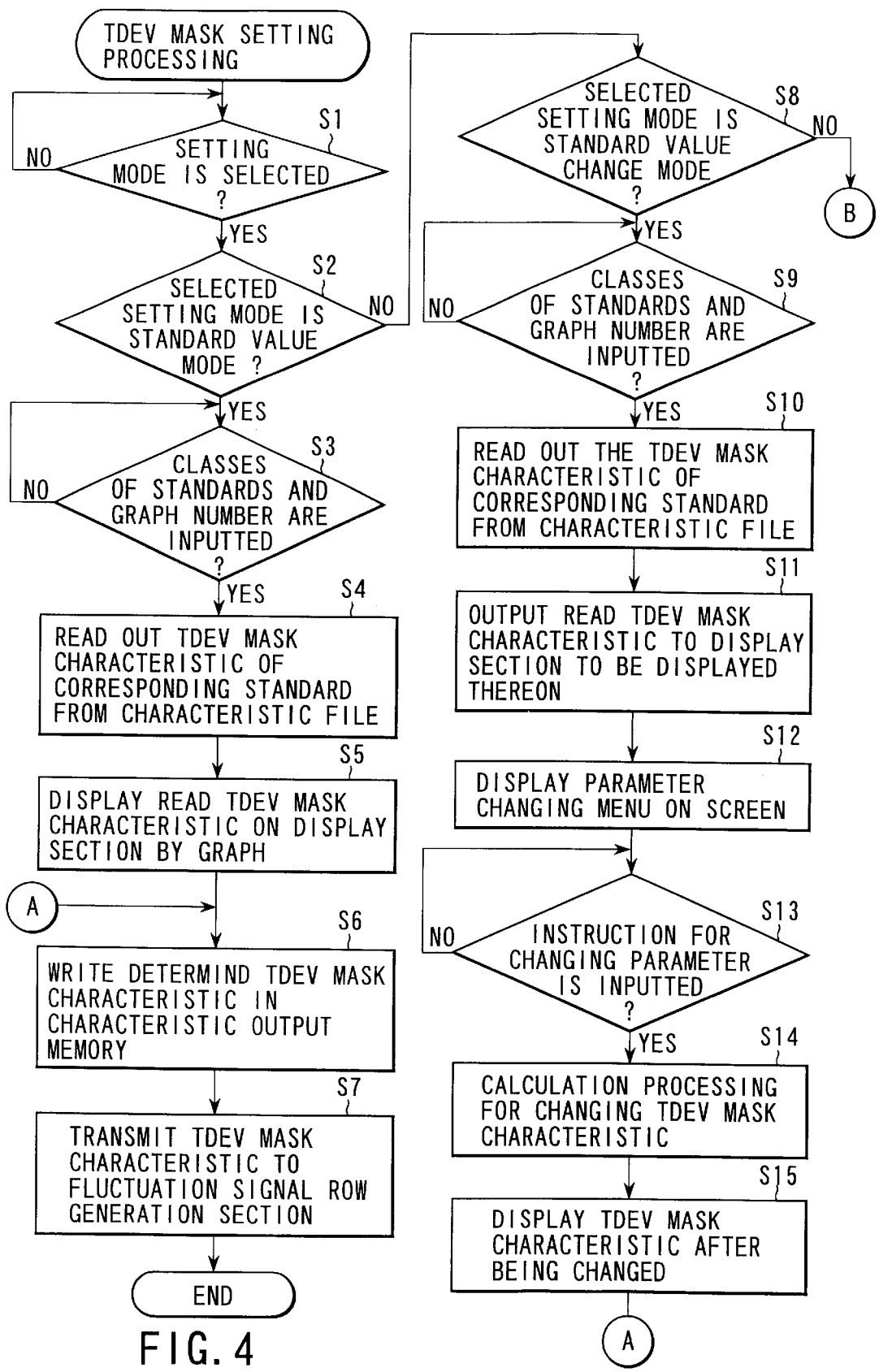
FIG. 4 is a flowchart for explaining an operation of the TDEV mask characteristic setting apparatus shown in FIG. 1.

In the TDEV mask characteristic setting apparatus 12 having such a configuration, the aforementioned TDEV mask characteristic readout section 32, the changing designation taking section 33, the TDEV mask characteristic changing section 34, the mask pattern readout section 35, the new parameter taking section 36, the TDEV mask characteristic newly creating section 37 and the characteristic output section 38 perform the setting processing of the TDEV mask characteristic in accordance with a flowchart shown in FIG. 4.

At first, the operator selects a setting mode by the operational button of the operating section 27 (step S1).

Therefore, in the case that the selected setting mode is a standard value mode (step S2), it is determined that this mode is a mode for using the TDEV mask characteristics 5 determined by respective standards ANSI, ITU-T, ETSI which are stored in the TDEV mask characteristic file 29, as they are.

If one standard number and one graph number among the aforementioned three classes of standards are designated by the operating section 27 (step S3), the TDEV mask characteristic readout section 32 is activated. Then, the TDEV mask characteristic 5 of the designated graph number of the standard designated from the TDEV mask characteristic file 29 is read out (step S4), the TDEV mask characteristic readout section 32 outputs it to the display section 28 to be displayed (step S5).

In this case, the TDEV mask characteristics 5 themselves are graphically developed and displayed as well as respective parameters A0, A1, A2, . . . , $\tau$0, $\tau$1, $\tau$2, $\tau$3, . . . of the respective line segments 6a, 6b, . . . constituting the TDEV mask characteristics 5 as shown in FIGS. 10A and 10B are displayed.

Figure 11A:
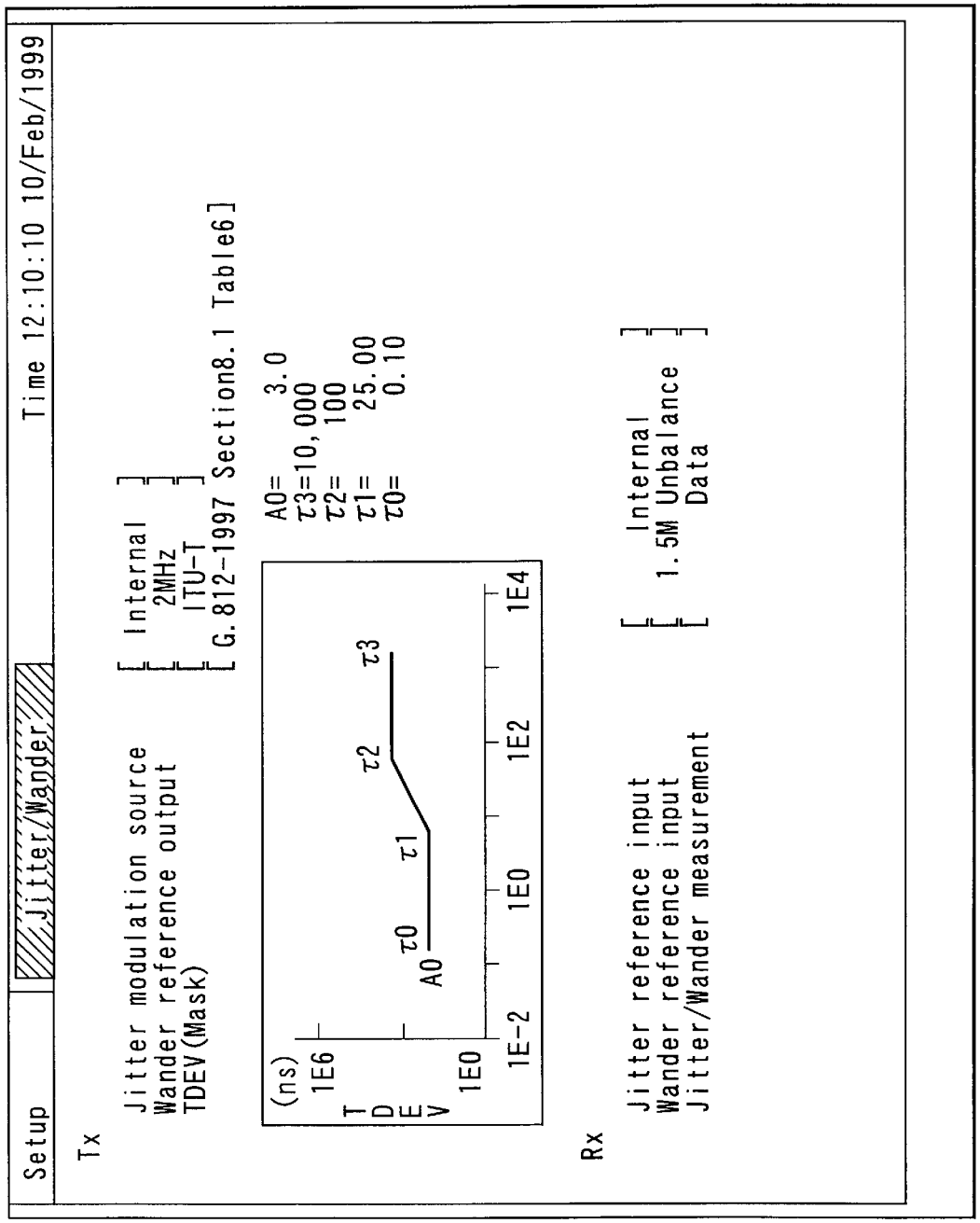
FIG. 11A is a diagram for illustrating one example in the case that the TDEV mask characteristics which are determined by the standard are displayed according to the present invention.

Specifically, as shown in FIG. 11A, for example, the TDEV mask characteristic which is determined by a measurement standard of the aforementioned ITU-I, is displayed on the screen of the computer.

In this case, in the graphic display section on the screen of the computer, the TDEV mask data constituted by connecting a plurality of line segments is displayed on a coordinate in which a horizontal axis represents an integral time and a vertical axis represents a characteristic value.

Then, the TDEV mask characteristics 5 displayed on this display section 28 is written in the characteristic output memory 31 as a determined TDEV mask characteristic (step S6).

As described above, in this case, respective characteristic values in respective integral times $\tau(=n\tau_s)$ in the TDEV mask characteristics 5 are written in the characteristic output memory 31.

Next, the characteristic output section 38 is activated to transmit the TDEV mask characteristic comprising respective characteristic values in respective integral times $\tau(=n\tau_s)$, which are written in the characteristic output memory 31, to the fluctuation signal row generation section 13 (step S7).

Thus, the processing in the case that the TDEV mask characteristics 5 determined by the standards are directly employed is terminated.

Alternatively, in the case that the selected setting mode in the step S1 is a standard value change mode (step S8), it is determined that this mode is a mode for changing a portion of the TDEV mask characteristic which is determined by respective standards ANSI, ITU-T, ETSI which are stored in the TDEV mask characteristic file 29, and using it.

Then, if one standard number and one graph number among the aforementioned three classes of standards are designated by the operating section 27 (step S9), the TDEV mask characteristic readout section 32 is activated. Then, the TDEV mask characteristic 5 of the designated graph number of the standard designated from the TDEV mask characteristic file 29 is read out (step S10), outputted to the display section 28 to be displayed (step S11).

In this case, the TDEV mask characteristics 5 themselves are graphically developed and displayed as well as respective parameters A0, A1, A2, . . . , $\tau$0, $\tau$1, $\tau$2, $\tau$3, . . . of the respective line segments 6a, 6b, . . . constituting the TDEV mask characteristics 5 as shown in FIGS. 10A and 10B are displayed (step S12).

Figure 11B:
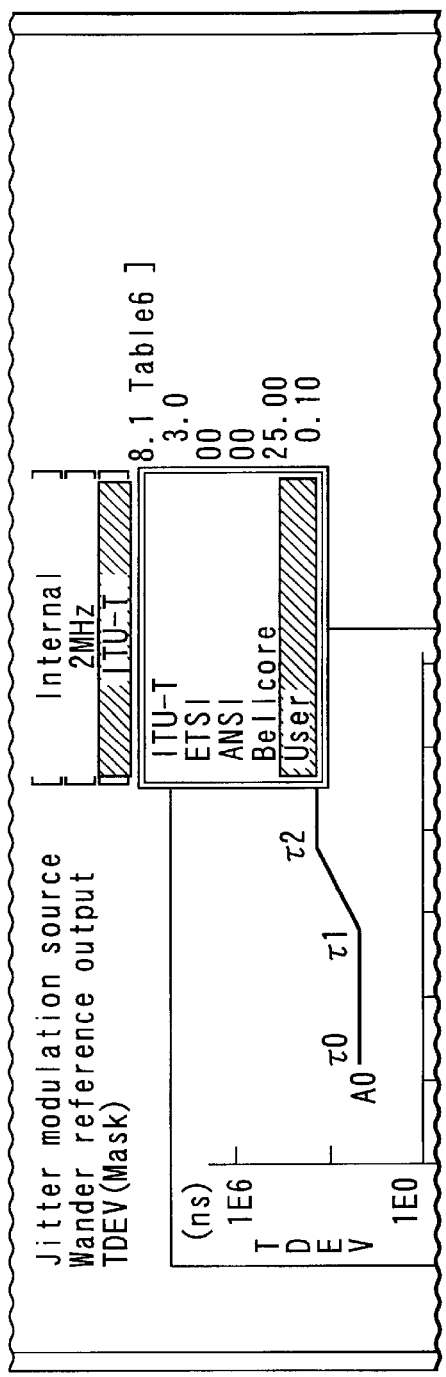
FIGS. 11B and 11C are diagrams for illustrating one example in the case that the TDEV mask characteristics which are determined by the standard, are changed and an arbitrary TDEV mask characteristic is displayed according to the present invention.

Specifically, as shown in FIG. 11B, for example, a portion of "User" (shaded area in the drawing) meaning a standard value change mode, i.e., meaning that the operator sets an arbitrary TDEV mask characteristic is clicked from a lower menu which is opened by clicking the ITU-T (shaded area in the drawing) while the TDEV mask characteristic which is determined by a measurement standard of the aforementioned ITU-I, is displayed on the screen of the computer.

Figure 11C:
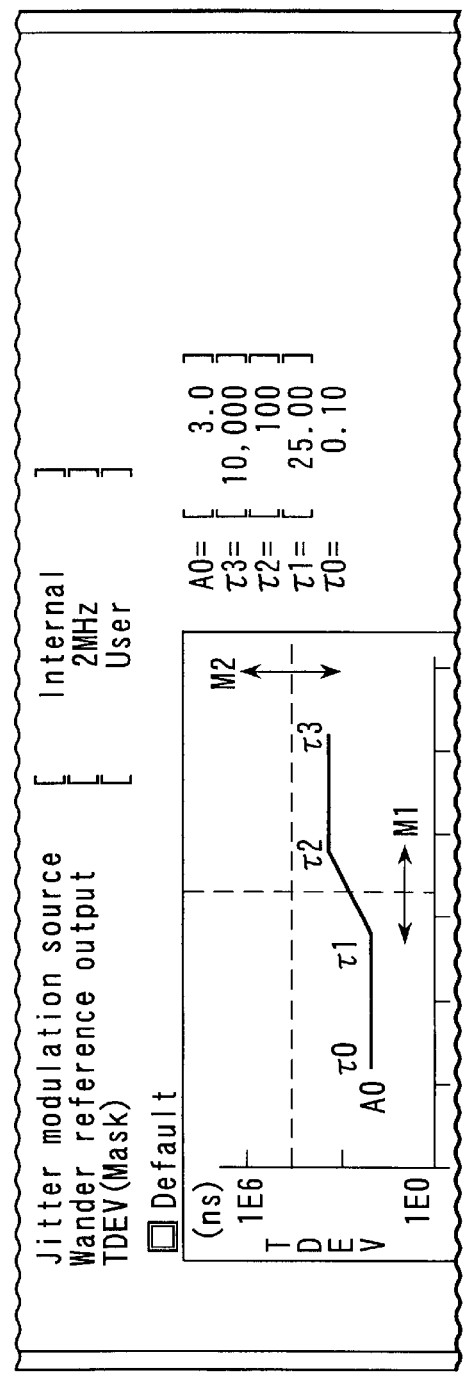

Thus, the operator shifts to a screen of a standard value change mode as shown in FIG. 11C.

In other words, when this screen itself shows a state that for example, the TDEV mask characteristic which is determined by the aforementioned ITU-T measurement standard is displayed as a default, in order to set an arbitrary TDEV mask characteristic by using this display, the operator inputs various changing items by the operation of the operating section 27.

In this case, in the graphic display section on the screen, the TDEV mask data constituted by connecting a plurality of line segments is displayed on a coordinate in which the horizontal axis represents an integral time and the vertical axis represents a characteristic value.

Further, the information to be changed with respect to the line segments 6a, 6b, which the operator wishes to change is inputted from the operating section 27 (step S13).

The operator inputs a value of a X axis or a Y axis of any line segment by a key or a knob as information to be changed (changing parameter) while seeing the TDEV mask characteristic which is displayed on the coordinate in which a horizontal (X) axis represents an integral time and a vertical (Y) axis represents a characteristic value, on the screen of the display section 28.

In this case, as shown in FIG. 11C, by movably setting markers M1, M2 on the coordinate of the screen of the display section 28 and changing these markers M1, M2, the X axis or the Y axis of any line segment may be inputted as the information to be changed (changing parameter).

Then, the changing designation taking section 33 is activated and the inputted changing parameter is transmitted to the TDEV mask characteristic changing section 34.

By using the information to be changed of the inputted parameters of the respective line segments 6a, 6b, this TDEV mask characteristic changing section 34 calculates respective parameters A0, A1, A2, . . . , τ0, τ1, τ2, τ3, . . . including the start points, the end points, and the characteristic values at the start points of respective line segments 6a, 6b constituting the TDEV mask characteristics 5 which is read out from the TDEV mask characteristic file 29 (step S14).

Then, the calculated TDEV mask characteristic after being changed is outputted to the display section 28 to be displayed (step S15).

Further, the TDEV mask characteristic 5 which is displayed on this display section 28 is written in the characteristic output memory 31, as a TDEV mask characteristic which is arbitrarily set by the operator (step S6).

Next, the TDEV mask characteristics comprising respective characteristic values in respective integral times $\tau(=n\tau_s)$, which are written in the characteristic output memory 31 are transmitted to the fluctuation signal row generation section 13 via the characteristic output section 38 (step S7).

Thus, the processing in the case that the TDEV mask characteristics 5 determined by the standards are partially changed to be employed is terminated.

Here, a specific calculation operation of the TDEV mask characteristic changing section 34 will be explained with reference to FIGS. 6A, 6B, 7A, 7B, 8A and 8B.

Figure 6A:
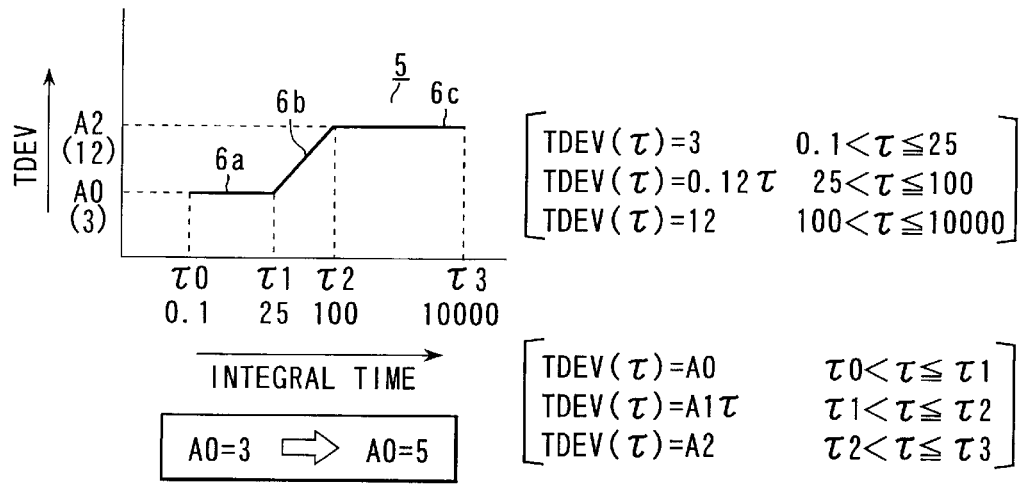
FIGS. 6A and 6B are diagrams for explaining a changing operation of the TDEV mask characteristic in the TDEV mask characteristic setting apparatus shown in FIG. 1.
Figure 6B:
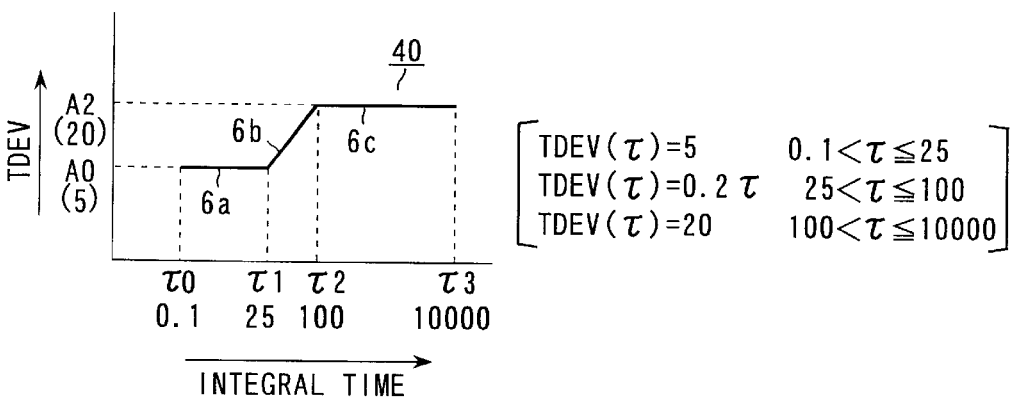

FIGS. 6A and 6B illustrate a calculation procedure for changing a portion of the TDEV mask characteristic 5 (a characteristic value A at the start point τ0 of the line segment 6a) constituted by connecting three line segments 6a, 6b, 6c, which are defined by the standards shown in FIG. 6A, and creating a new TDEV mask characteristics 40 shown in FIG. 6B.

It is assumed that respective line segments 6a, 6b, 6c of the TDEV mask characteristic 5, which are defined by the standards, are represented by the expression (4).

$TDEV(\tau)=A0 \tau 0<\tau\leq\tau 1$ $TDEV(\tau)=A1\tau\tau 1<\tau\leq\tau 2$ $TDEV(\tau)=A2\tau 2<\tau\leq\tau 3$ where, A1τ1=A0

A1τ2=A2 (4)

Here, it is assumed that A0=3, A1=0.12, A2=12, τ0=0.1, τ1=25, τ2=100, τ3=10000.

These respective parameters serve to specify the line segments 6a, 6b, 6c constituting this TDEV mask characteristic 5.

Here, it is assumed that a parameter of the characteristic value A0 of the start point τ (=0.1) of the line segment 6a at a head in the TDEV mask characteristic 5 is changed from A0=3 to A0=5.

In this case, also in the new TDEV mask characteristic 40, it is assumed that the start points and the ending points of respective line segments 6a, 6b, 6c are not changed and respective line segments 6a, 6b, 6c are connected.

In FIG. 6B, the characteristic values in a connecting point τ1(=25) of the line segment 6a and the line segment 6b are equal, so that A1τ1=A0 (=5) is obtained. Further, the indication A1 of the line segment 6b is represented by A1=A0/τ1=5/25=0.2.

Similarly, in FIG. 6B, the characteristic values at a connecting point τ2 of the line segment 6a and the line segment 6b are equal, so that A2=A1, τ1=0.2×100=20 is obtained. Respective line segments 6a, 6b, 6c of the new TDEV mask characteristic 40 after being changed are represented by the expression (5).

$TDEV(\tau)=5\ 0.1<\tau\leq 25$ $TDEV(\tau)=0.2\tau 25<\tau\leq 100$ $TDEV(\tau)=20\ 1000<\tau\leq 10000$ (5)

Thus, only by inputting the start point in a portion, which the operator wishes to change, on the TDEV mask characteristic 5 determined by the standard and the information to be changed of the parameter between the characteristic values at the start point by the operator, the parameters in other relating portions in the TDEV mask characteristic 5 are automatically changed.

Accordingly, it is possible to improve the operating efficiency of this TDEV mask characteristic setting apparatus 12 to a large degree.

Figure 7A:
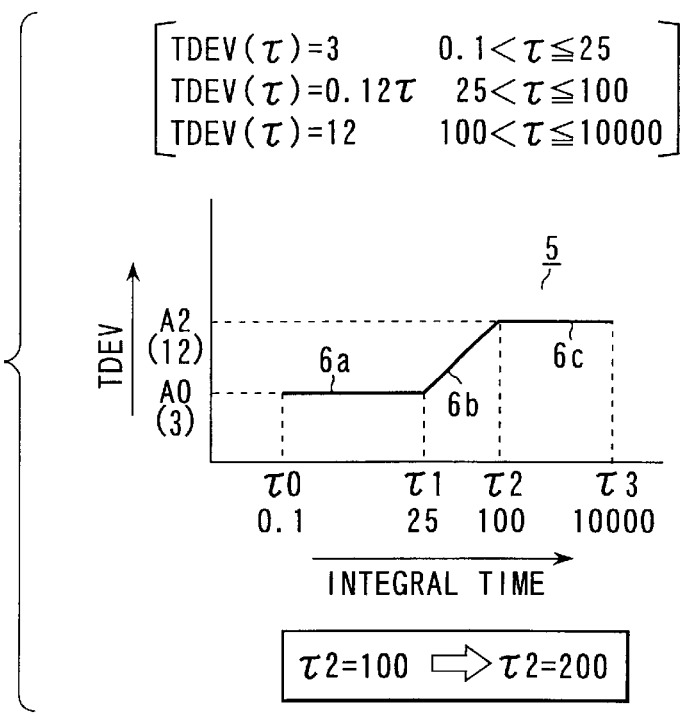
FIGS. 7A and 7B are diagrams for explaining a changing operation of the TDEV mask characteristic in the TDEV mask characteristic setting apparatus shown in FIG. 1.
Figure 7B:
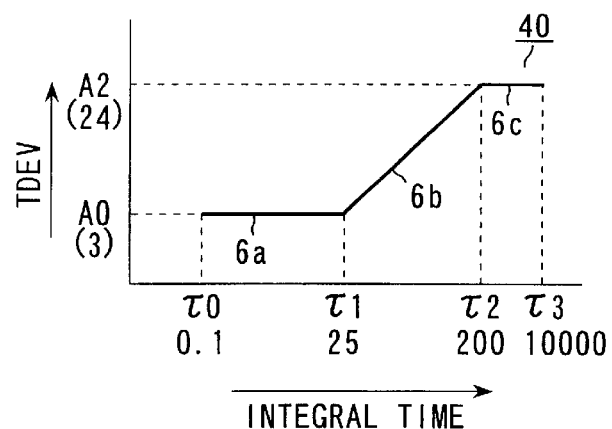

FIGS. 7A and 7B illustrate a calculation procedure for creating a new TDEV mask characteristic 40 by changing a portion of the TDEV mask characteristic 5 (a start point τ2 at the line segment 6c), which is defined by the standards shown in FIG. 6A and FIG. 7A (same as FIG. 6A) and is shown in FIG. 7B.

It is assumed that respective line segments 6a, 6b, 6c of the new TDEV mask characteristic defined by the standards are represented by the expression (6).

$TDEV(\tau)=A0=3\tau 0<\tau\leq\tau 1$ $TDEV(\tau)=A1\tau=0.12\tau\tau 1<\tau\leq\tau 2$ $TDEV(\tau)=A2=12\tau 2<\tau\leq\tau 3$ (6)

It is assumed that A0=3, A1=0.12, A2=12, τ0=0.1, τ1=25, τ2=100, τ3=10000.

Here, it is assumed that a parameter of the start point τ2(=100) of the third line segment 6c in the TDEV mask characteristic 5 is changed from τ2=100 to τ2=200.

In this case, also in the new TDEV mask characteristic 40, the characteristic values (A1τ2) in the ending points of the line segment 6b and characteristic value (A2) in the start point τ2 of the line segment 6b are equal, so that A1τ2=A2, A2=0.12×200=24 is obtained. Then, the respective line segments 6a, 6b, 6c in the TDEV mask characteristic 40 after being changed are represented by the following expression (7).

$TDEV(\tau)=3\ 0.1<\tau\leq 25$ $TDEV(\tau)=0.12\tau 25<\tau\leq 200$ $TDEV(\tau)=24\ 2000<\tau\leq 10000$ (7)

Also, in this case, only by inputting the instruction to change the start point in a portion, which the operator wishes to change, on the TDEV mask characteristic 5 determined by the standard and the parameter at the start point by the operator, the parameters in other relating portions in the TDEV mask characteristic 5 are automatically changed.

Figure 8A:
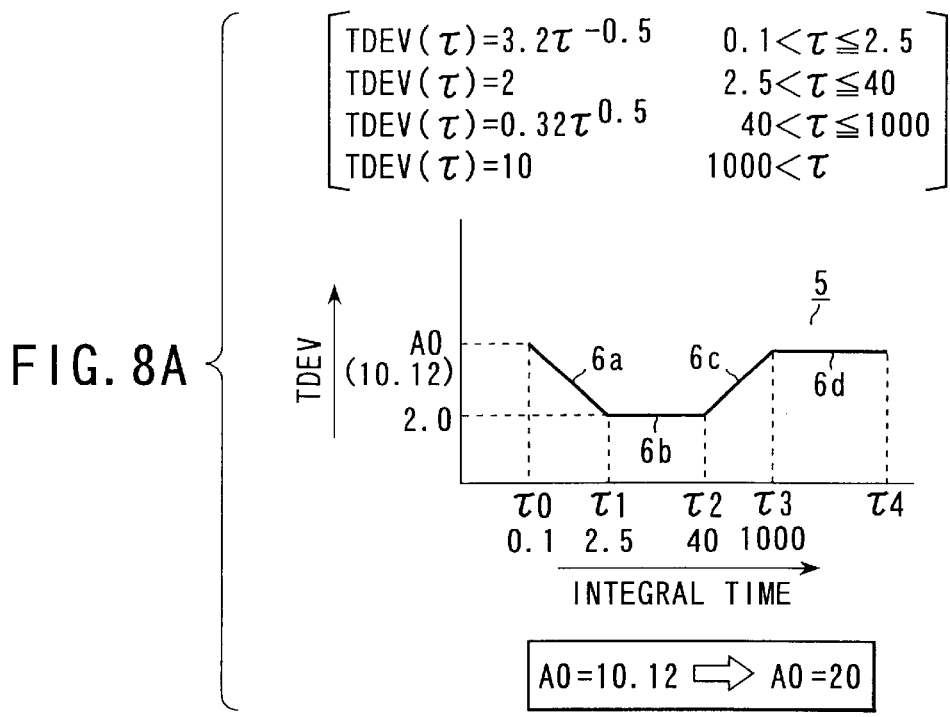
FIGS. 8A and 8B are diagrams for explaining a changing operation of the TDEV mask characteristic in the TDEV mask characteristic setting apparatus shown in FIG. 1.
Figure 8B:
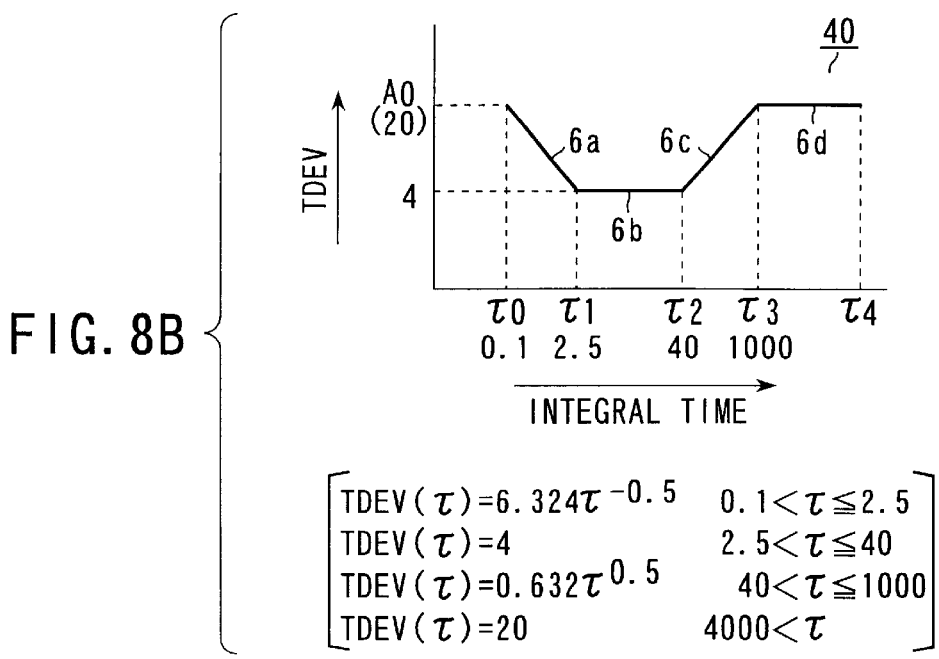

FIGS. 8A and 8B illustrate a calculation procedure for creating a new TDEV mask characteristic 40 shown in FIG. 8B by changing a portion of the TDEV mask characteristic 5 (a characteristic value A0 in a start point τ0 at the line segment 6a), which is defined by the standards shown in FIG. 8A.

It is assumed that the respective line segments 6a, 6b, 6c, 6d of the TDEV mask characteristic 5 which is defined by the standards are represented in the following expression (8).

$$TDEV(\tau)=32\tau^{-0.5} \quad 0.1<\tau\leq2.5$$
$$TDEV(\tau)=2 \quad 2.5<\tau\leq40$$
$$TDEV(\tau)=0.32\tau^{0.5} \quad 40<\tau\leq1000$$
$$TDEV(\tau)=10 \quad 1000<\tau \quad (8)$$

However, the characteristic value A0 at the staring point $\tau0=0.1$ of a head of the line segment 6a is 10.12.

Here, it is assumed that a parameter of the start point $\tau0(=0.1)$ of the head of line segment 6a in the TDEV mask characteristic 5 is changed from A0=10.12 to A0=20.

If the inclination of the head of line segment 6a in the TDEV mask characteristic 40 after being changed shown in FIG. 8B is determined as A1, $A0=20=A1\tau0^{-0.5}=A1 (0.1)^{-0.5}$ is obtained. Therefore, the inclination A1=6.324 is obtained.

If the characteristic value of the second line segment 6b of the TDEV mask characteristic 40 after being changed is defined as A2, $A2=a1\pi1^{-0.5}=6.324\times(2.5)^{-0.5}=3.999\approx4.0$ is obtained.

Further, if the inclination of the third line segment 6c of the TDEV mask characteristic 40 after being changed is defined as A3, the characteristic value of the start point $\tau2$ of the third line segment 6c is A2, so that $A2=4.0=A3\tau2^{0.5}=A3(40)^{0.5}$ is obtained. Further, the inclination A3=0.632 is obtained.

Finally, if the characteristic value of the forth line segment 6d of the TDEV mask characteristic 40 after being changed is defined as A4, $A4=A3\pi3^{0.5}=0.632\times(1000)^{0.5}=19.98\approx20$ Accordingly, the respective line segments 6a, 6b, 6c, 6d of the TDEV mask characteristic 40 after being changed shown in FIG. 8B are represented by the following expression (9).

$$TDEV(\tau)=A1\tau^{-0.5}=6.324\tau^{-0.5} \quad 0.1<\tau\leq2.5$$
$$TDEV(\tau)=A2=4 \quad 2.5<\tau\leq40$$
$$TDEV(\tau)=A3\tau^{0.5}=0.632\tau^{0.5} \quad 40<\tau\leq1000$$
$$TDEV(\tau)=A4=20 \quad 1000<\tau \quad (9)$$

However, the characteristic value A0 at the start point $\tau0=0.1$ of the head of the line segment 6a is 20.

Also in this case, only by inputting the instruction to change the start point in a portion, which the operator wishes to change, on the TDEV mask characteristic 5 determined by the standard and the parameter of the characteristic value at the start point by the operator, the parameters in other relating portions in the TDEV mask characteristic 5 are automatically changed.

Figure 5:
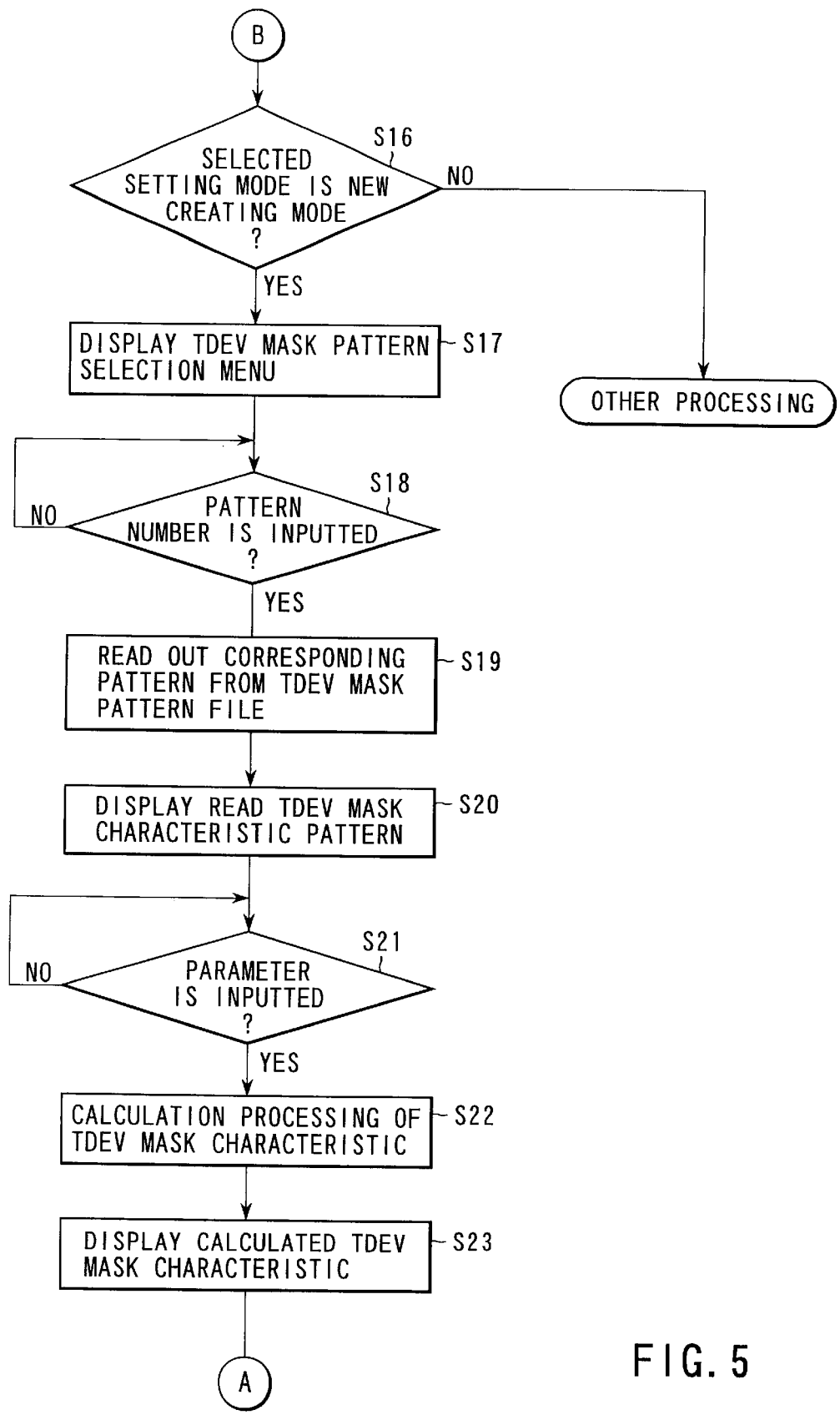
FIG. 5 is a flowchart for explaining an operation of the TDEV mask characteristic setting apparatus shown in FIG. 1.

Alternatively, in the case that the selected setting mode in the step S1 shown in FIG. 4 is a newly creating mode (in the case of steps S2, S8: NO), the processing shifts to step S16 in a flowchart shown in FIG. 5.

Further, in the case that the setting mode is the newly creating mode, instead of using respective TDEV mask characteristics which are stored in the TDEV mask characteristic file 29, it is determined that this mode is a mode for creating a new TDEV mask characteristic which is not defined by any standards.

In this setting mode, at first, a selection menu of twelve TDEV mask patterns 39 shown in FIG. 3 which are stored in the TDEV mask pattern file 30 is displayed (step S17).

If the operator selects one TDEV mask patterns 39 by a pattern number through the operating section 27 (step S18), the mask pattern readout section 35 is activated to read out the TDEV mask patterns 39 of the corresponding pattern number which is recorded in the TDEV mask pattern file 30, the items of respective line segments 6a, 6b, 6c, 6d, . . . which should be at least inputted, and a calculation expression for calculating respective parameters A0, A1, A2, . . . , $\tau0, \tau1, \tau2, \tau3$, . . . (step S19).

Then, the TDEV mask patterns 39 and the items of respective line segments 6a, 6b, . . . which should be at least inputted are displayed on the display section 28 (step S20).

In this case, before the operator selects one TDEV mask patterns 39 by the pattern number through the operating section 27, the TDEV mask patterns 39 or the like which are obtained by a learning function and were frequently used in the past may be displayed on the display section 28 as a default.

In this state, the operator inputs the parameters of respective line segments 6a, 6b, 6c, 6d, . . . displayed on the display section 28 which should be at least inputted through the operating section 27 (step S21).

The operator inputs a value of a X axis or a Y axis of any line segment by a key or a knob as information to be changed while seeing the TDEV mask characteristic which is displayed on the coordinate in which a horizontal (X) axis represents an integral time and a vertical (Y) axis represents a characteristic value.

In this case, by movably setting markers on the coordinate and changing these markers, the operator may input the information to be changed.

Then, a new parameter taking section 36 is activated to transmit the inputted respective parameters to the TDEV mask characteristic newly creating section 37.

This TDEV mask characteristic newly creating section 37 calculates all parameters A0, A1, A2, . . . , $\tau0, \tau1, \tau2, \tau3$, . . . for specifying respective line segments 3a, 3b, . . . of the TDEV mask pattern 39 by using the calculation expression which is read out from the TDEV mask pattern file 30, from the inputted respective parameters (step S22).

Further, the TDEV mask characteristic newly creating section 37 outputs the calculated respective parameters A0, A1, A2, . . . , $\tau0, \tau1, \tau2, \tau3$, . . . and the TDEV mask characteristic to the display section 28 to display the same. (step S23).

Then, the TDEV mask characteristic which is displayed on this display section 28 is written in the characteristic output memory 31 as a TDEV mask characteristic which is arbitrarily set by the operator (step S6 in FIG. 4).

The TDEV mask characteristics comprising respective characteristic values in respective integral times $\tau(=n\tau_s)$ which are written in the characteristic output memory 31 are transmitted to the fluctuation signal row generation section 13 via the characteristic output section 38 (step S7 in FIG. 4).

Thus, the processing in the case of creating new TDEV mask characteristic which is not defined by any standards is terminated.

According to the TDEV mask characteristic setting apparatus 12 of the wander generator constituted as described above, a plurality of TDEV mask characteristics 5 constituted by connecting a plurality of line segments 6a, 6b, . . . , which are defined by respective standards ANSI, ITU-T, ETSI and the like, respectively, are stored in the TDEV mask characteristic file 29.

Further, in the TDEV mask pattern file 30, the TDEV mask patterns 39 which is the patterns of a plurality of TDEV mask characteristics which are expected to be newly requested to be set are stored.

In the case of executing the test with regard to the wander in the measured system by using the wander generator, the operator is capable of selecting and setting the TDEV mask characteristic for specifying the wander of the clock signal as a test signal to be applied from the wander generator to the measured system in a wide range.

Specifically, the operator is capable of arbitrarily changing the TDEV mask characteristic by changing the TDEV mask characteristic in the TDEV mask characteristic setting apparatus 12.

According to this embodiment, in the case of directly using the TDEV mask characteristic, which is defined by the standards, the operational mode is set to a standard value mode and one TDEV mask characteristic which is stored in the TDEV mask characteristic file 29 is designated.

In the case of partially changing the TDEV mask characteristic, which is defined by the standards, and using it, the operational mode is set to a standard value change mode and one TDEV mask characteristic which the operator wishes to change, which is stored in the TDEV mask characteristic file 29 is selected, the operator operatively inputs the changing of the start points of one or plural line segments 6a, 6b, 6c, which should be changed in this TDEV mask characteristic or the characteristic values at the start points.

Then, by using a boundary condition such that the adjacent line segments 6a, 6b, 6c are connected each other, respective parameters such as the inclination and the like to be changed in respective line segments are automatically calculated and the TDEV mask characteristic after being changed is automatically set.

In the case of using a completely new TDEV mask characteristic which is not defined by the standards, the operational mode is set to the newly creating mode and a TDEV mask pattern which is identical with a pattern of the TDEV mask characteristic which is newly created is read out from the TDEV mask pattern file 30, the operator operatively inputs the value of the very minimum input items (the start point or a characteristic value at the start point) of the displayed respective parameters.

Then, as well as the aforementioned case, by using the boundary condition such that the adjacent line segments 6a, 6b, 6c are connected each other, respective parameters such as the inclination and the like to be changed in respective line segments are automatically calculated and the TDEV mask characteristic after being changed is automatically set.

Thus, according to the TDEV mask characteristic setting apparatus 12 of the present invention, it is possible to arbitrarily set the TDEV mask characteristic.

Additionally, the operator may input only the minimum parameter without changing the TDEV mask characteristic or without inputting all parameters including the start point, the inclination and the characteristic value at the start point for specifying respective line segments constituting the TDEV mask characteristic in the case of newly creating a TDEV mask characteristic. Therefore, it is possible to increase the operating efficiency to the large extent.

Accordingly, it is possible to improve a test operating efficiency with respect to the wander in the measured system for the use of the wander generator in which this TDEV mask characteristic setting apparatus 12 is incorporated to the large extent.

As described above, according to the TDEV mask characteristic setting apparatus of the present invention, in addition to respective TDEV mask characteristics, which are defined by the standards, it is possible to accurately set arbitrary TDEV mask characteristics, which are required by the measure, with simple operation, so that it is possible to enlarge the measuring range regarding the wander with respect to the measured system for the use of the wander generator, in which this apparatus is incorporated, to the large extent as well as it is possible to improve the measuring operating efficiency to the large extent.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wander generator having an arbitrary TDEV mask characteristic setting apparatus comprising:

wander generation means for generating a clock signal including a wander; and

TDEV mask characteristic setting means which is used in said wander generation means to set a TDEV mask characteristic which is belonged to the wander included in the clock signal generated by said wander generation means;

said TDEV mask characteristic setting means comprising:

a file, in which the TDEV mask data information including the TDEV mask data constituted by connecting a plurality of line segments and a calculation expression for forming said TDEV mask data on a coordinate in which a horizontal axis represents an integral time and a vertical axis represents a characteristic value, are stored in advance;

TDEV mask data information readout means for reading out predetermined TDEV mask data information from said file;

a display section for displaying the line segment which is represented by said desired TDEV mask data information, which is read out by said TDEV mask data information readout means;

an operating section for inputting information for changing at least one of the start point and the characteristic value to the desired value with respect to the line segment to be represented by said desired TDEV mask data information which is displayed on said display section; and a TDEV mask data change section for receiving information inputted by said operating section, changing the TDEV mask data information based on the calculation expression of said TDEV mask data information, which represents the line segment displayed on said display section, and displaying the line segment which is represented by said changed TDEV mask data information on said display section.

2. A wander generator according to claim 1, wherein said operating section serves as an operating section for designating predetermined TDEV mask data information which is read out from said file.

3. A wander generator according to claim 2, wherein said operating section is capable of selecting a standard value mode for directly employing the TDEV mask characteristic which is defined by a standard, a standard value change mode for partially changing the TDEV mask characteristic, which is defined by a standard and using it, and a newly creating mode for creating a new TDEV mask characteristic which is not defined by a standard.

4. A wander generator according to claim 1, wherein TDEV mask data information corresponding to the TDEV mask characteristic which is defined by standards is stored in advance in said file as said TDEV mask data information.

5. A wander generator according to claim 4, wherein a plurality of said TDEV mask characteristics which are defined by at least one of the three standards, ANSI, ITU-I and ETSI, and constituted by connecting a plurality of line segments, respectively, are stored in said file.

6. A wander generator according to claim 5, wherein parameters such as a start point for each line segment, a characteristic value at the start point and the inclination when the inclination exists and the like of said TDEV mask characteristic are stored and held in said file.

7. A wander generator according to claim 6, wherein said TDEV mask pattern indicates of how many line segments said TDEV mask characteristic is constituted, discrimination between respective line segments are horizontal (inclination=0) or respective line segments are inclined in any direction and a combination pattern of respective line segments having this discrimination.

8. A wander generator according to claim 6, wherein items of parameters of respective line segments, which the operator should at least input in order to obtain the TDEV mask characteristic corresponding to this pattern, are stored together with said TDEV mask pattern in said file for every TDEV mask pattern by using the corresponding TDEV mask pattern.

9. A wander generator according to claim 8, wherein a calculation expression for calculating all parameters to specify respective line segments is further stored in said file by using the parameter, which is inputted in the case that the parameter of said corresponding item is inputted.

10. A wander generator according to claim 4, wherein said TDEV mask data information readout means reads out said TDEV mask characteristic which is defined by the standard from said file as a default and displays it on said display section as said predetermined TDEV mask data information.

11. A wander generator according to claim 10, wherein said TDEV mask data information readout means reads out the TDEV mask patterns, which are obtained by a learning function and were frequently used in the past, from said file as said TDEV mask characteristic, which is defined by the standard, and displays it on said display section.

12. A wander generator according to claim 10, wherein said display section displays said standard name in addition to said TDEV mask characteristic defined by the standard as said default, further said display section displays a mode selection menu under a condition that said standard name is clicked and shifts to display of a predetermined mode under a condition that said predetermined mode is clicked.

13. A wander generator according to claim 12, wherein said display section displays a marker for changing at least one of the start point and the characteristic value to a desired value on the display screen of said TDEV mask characteristic defined by the standard under a condition that it shifts to display of a predetermined mode.

14. A wander generator according to claim 1, wherein TDEV mask data information corresponding to a new TDEV mask characteristic which is not defined by standards, is stored in advance in said file as said TDEV mask data information.

15. A wander generator according to claim 4, wherein TDEV mask patterns as patterns of a plurality of TDEV mask characteristics which are expected to be newly required to be set are stored in said file as new TDEV mask characteristics which are not defined by the standard.

16. A wander generator according to claim 14, wherein said TDEV mask data information readout means reads out the TDEV mask data information corresponding to a new TDEV mask characteristic which is not defined by the standard from said file as a default and displays it on said display section as said predetermined TDEV mask data information.

17. A wander generator according to claim 16, wherein, upon reading out the TDEV mask data information corresponding to a new TDEV mask characteristic, which is not defined by the standard, from said file as a default and displaying it on said display section, said TDEV mask data information readout means reads out the TDEV mask patterns which are obtained by a learning function and were frequently used in the past, from the TDEV mask data information corresponding to said new TDEV mask characteristic, which is not defined by the standard, from said file and displays it on said display section.

18. A wander generator according to claim 16, wherein said display section displays a marker for changing at least one of the start point and the characteristic value to a desired value on the display screen of said TDEV mask characteristic information corresponding to said new TDEV mask characteristic which is not defined by the standard.

19. A wander generator according to claim 1, wherein said wander generation means is constituted of a center frequency setting section, a fluctuation signal row generation section, an adding section, a DDS (direct-digital-synthesizer) and a clock signal output circuit;

said center frequency setting section transmits the digital data for determining a center frequency of the output signal of said DDS to said adding section as a center frequency of a clock signal to be employed in a test signal, which is outputted from said wander generation means;

said fluctuation signal row generation section generates a fluctuation signal row and transmits it to said adding section on the basis of the TDEV mask characteristic, which is created in accordance with the instruction by the operator from said TDEV mask characteristic setting means;

said adding section adds the data which is set by said center frequency setting section and the fluctuation signal row which is outputted from said fluctuation signal row generation section, to transmit the data of this addition result to said DDS;

said DDS reads out the waveform data of a clock signal to which a component of said fluctuation signal row which is included in the data of the addition result from said adding section is added as the wander, with respect to a stored reference sine waveform; and said clock signal output circuit forms the wave of the signal which is outputted from said DDS, and creates a clock signal to which a wander is finally added.

20. A wander generator according to claim 19, wherein said fluctuation signal row generation section is constituted of a noise generation section, an impulse response calculation section, a memory and a convolutional calculation section;

said noise generation section generates a PN (pseudo noise) signal and transmits it to said convolutional calculation section;

said impulse response calculation section calculates a tap coefficient for every time of an impulse response of a transfer function which approaches a power spectrum density distribution characteristic of a change amount of a phase difference, which is indicated by the TDEV mask characteristic inputted from said TDEV mask characteristic setting means and stores it in said memory; and said convolutional calculation section outputs a fluctuation signal, which satisfies the TDEV mask characteristic inputted from said TDEV mask characteristic setting means, by performing the convolutional calculation by using the PN signal outputted from said noise generation section and the tap coefficient for every time which is stored in said memory.

21. A wander generator according to claim 19, wherein said DDS is constituted of an adder, a latch circuit, a waveform memory and a digital/analog (D/A) converter;

said latch circuit latches the outputted data from said adder with synchronizing the outputted data with the clock signal having a further higher frequency compared with the frequency of the clock signal to be outputted from said clock signal output circuit;

said adder adds the data of the addition result including a component of the inputted fluctuation signal row and the data latched by said latch circuit to transmit the added data to said latch circuit;

said waveform memory reads out the data of the address which is designated by the output of said latch circuit in which a sine wave data is stored in a continuous address range in advance, and stores and hold it, and the data of the fluctuation signal row is stored in said waveform memory with respect to a reference sine waveform; and said digital/analog (D/A) converter reads out the waveform data which is stored in said waveform memory, and converts it into an analog signal to transmit it to said clock signal output circuit.

22. A wander generator according to claim 19, wherein said clock signal output circuit is constituted of a band pass filter (BPF) and a comparator;

said BPF forms the waveform of the analog signal of a step waveform to be outputted from said DDS in a pass band width corresponding to the data and outputs it to said comparator in order to form the waveform of the analog signal, which is outputted from said DDS and create a final clock signal; and said comparator binarizes the analog signal of which waveform is formed and outputted from said BPF with a threshold voltage, so that said comparator outputs said binarized signal as a clock signal having a rectangular waveform.

23. A wander generator according to claim 1, wherein said TDEV mask characteristic setting means further comprises a characteristic output memory;

TDEV mask data information which is changed by said TDEV mask characteristic changing section is stored in said characteristic output memory on the basis of said calculation expression of said TDEV mask data information representing the line segment displayed on said display section.

24. A method for setting an arbitrary TDEV mask characteristic which is used in a wander generator, comprising the steps of:

storing TDEV mask data information including the TDEV mask data constituted by connecting a plurality of line segments and a calculation expression for forming said TDEV mask data on a coordinate in which a horizontal axis represents an integral time and a vertical axis represents a characteristic value, in advance in a file;

designating desired TDEV mask data information;

reading out said desired TDEV mask data information from said file;

displaying a line segment which is represented by said read desired TDEV mask data information on a display section;

inputting information for changing at least one of the start point and the characteristic value to a desired value in the line segment represented by said desired TDEV mask data information which is displayed on said display section; and receiving said inputted information and changing the TDEV mask data ifnromation based on the calculation expression of said TDEV mask data information representing the line segment which is displayed on said display section, and simultaneously, displaying the line segment which is represented by said changed TDEV mask data information, on said display section.

* * * * *